US008900667B2

(12) United States Patent
Boggs et al.

(10) Patent No.: US 8,900,667 B2
(45) Date of Patent: Dec. 2, 2014

(54) ONE-COMPONENT, AMBIENT CURABLE WATERBORNE COATING COMPOSITIONS, RELATED METHODS AND COATED SUBSTRATES

(75) Inventors: Carol L. Boggs, Cheswick, PA (US); Anthony M. Chasser, Allison Park, PA (US); Kurt G. Olson, Gibsonia, PA (US); Narayan K. Raman, Pittsburgh, PA (US); Irina G. Schwendeman, Wexford, PA (US); Shanti Swarup, Allison Park, PA (US); Venkateshwarlu Kalsani, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 859 days.

(21) Appl. No.: 12/642,085

(22) Filed: Dec. 18, 2009

(65) Prior Publication Data

US 2011/0151128 A1    Jun. 23, 2011

(51) Int. Cl.
| | | |
|---|---|---|
| B05D 3/02 | (2006.01) | |
| C09D 183/10 | (2006.01) | |
| C08G 18/44 | (2006.01) | |
| C08G 18/09 | (2006.01) | |
| C09D 175/04 | (2006.01) | |
| C08G 18/50 | (2006.01) | |
| C08G 77/458 | (2006.01) | |
| C08G 77/452 | (2006.01) | |

(52) U.S. Cl.
CPC ............ *C08G 18/095* (2013.01); *C09D 183/10* (2013.01); *C08G 2105/06* (2013.01); *C08G 18/44* (2013.01); *C09D 175/04* (2013.01); *C08G 18/5024* (2013.01); *C08G 77/458* (2013.01); *C08G 77/452* (2013.01)
USPC ............... 427/385.5; 427/389.9; 524/591; 524/592; 524/598

(58) Field of Classification Search
USPC .......... 427/385.5, 389.9; 524/591, 592, 598
See application file for complete search history.

(56) References Cited

U.S. PATENT DOCUMENTS

| | | | |
|---|---|---|---|
| 4,042,558 A * | 8/1977 | von Bonin et al. ............ 523/219 |
| 4,250,070 A | 2/1981 | Ley | |
| 4,419,294 A | 12/1983 | Feldman | |
| 4,769,410 A | 9/1988 | Blum | |
| 4,786,676 A | 11/1988 | Blum | |
| 5,066,705 A * | 11/1991 | Wickert ........................ 524/457 |
| 5,147,926 A | 9/1992 | Meichsner | |
| 5,258,481 A | 11/1993 | Hesselmans | |
| 5,348,997 A | 9/1994 | Kato | |
| 5,357,021 A | 10/1994 | Tye | |
| 5,359,005 A | 10/1994 | Kania | |
| 5,447,970 A | 9/1995 | Tomita | |
| 5,472,996 A | 12/1995 | Hayashi | |
| 5,578,675 A | 11/1996 | Mormile | |
| 5,597,942 A * | 1/1997 | Pohl et al. ........................ 560/25 |
| 5,614,582 A | 3/1997 | Hori | |
| 5,688,875 A | 11/1997 | Sasaki | |
| 5,725,911 A | 3/1998 | Tsuneta | |
| 5,770,661 A | 6/1998 | Miyoshi | |
| 5,834,555 A | 11/1998 | Meisenburg | |
| 5,856,014 A | 1/1999 | Imashiro | |
| 5,859,166 A | 1/1999 | Sasaki | |
| 6,063,890 A | 5/2000 | Tye | |
| 6,248,819 B1 | 6/2001 | Masuda | |
| 6,395,824 B1 | 5/2002 | Beutler | |
| 6,428,856 B1 | 8/2002 | Masuda | |
| 6,599,975 B1 | 7/2003 | Licht | |
| 7,115,682 B2 | 10/2006 | Guo | |
| 7,439,316 B2 | 10/2008 | Josephus | |
| 7,498,379 B2 | 3/2009 | Kraemer | |
| 2002/0103278 A1 | 8/2002 | Krajnik | |
| 2007/0093594 A1 | 4/2007 | Schafheutle | |
| 2008/0176061 A1 | 7/2008 | Ambrose | |
| 2008/0262149 A1 | 10/2008 | Osawa | |
| 2009/0056873 A1 | 3/2009 | Schumacher | |
| 2009/0171016 A1* | 7/2009 | Sato et al. .................... 524/608 |
| 2009/0246393 A1 | 10/2009 | Ambrose | |

FOREIGN PATENT DOCUMENTS

WO    2009120559 A1    10/2009

\* cited by examiner

*Primary Examiner* — Robert S Walters, Jr.
(74) *Attorney, Agent, or Firm* — Christine W. Trebilcock

(57) ABSTRACT

Disclosed are coating compositions that can be one-component, ambient curable, and waterborne. The coating compositions include a polymer that is the reaction product of a polycarbodiimide and a ketocarboxylic acid. Also disclosed are substrates coated with a coating deposited from such compositions, as well as methods for depositing a coating on a substrate, and coated substrates.

16 Claims, No Drawings

ONE-COMPONENT, AMBIENT CURABLE WATERBORNE COATING COMPOSITIONS, RELATED METHODS AND COATED SUBSTRATES

FIELD OF THE INVENTION

The present invention relates to coating compositions. More particularly, the present invention relates to one-component, ambient curable, waterborne coating compositions. The present invention also relates to substrates coated with a coating deposited from such compositions, as well as methods for depositing a coating on a substrate.

BACKGROUND INFORMATION

Coating compositions in which all of the components are stored together in a single container are desirable in many cases from the standpoint of, for example, convenience to the end user. Among the properties that such coating compositions should exhibit is storage stability. In other words, the viscosity of the composition should not significantly increase over time to the point in which the composition is no longer suitable for convenient use for depositing a coating.

In many cases, it is desirable to use liquid coating compositions that are borne in water as opposed to organic solvents. This desire stems primarily from environmental concerns with the emission of volatile organic compounds (VOC) during the painting process.

It is also often desirable to provide coating compositions that are curable under ambient conditions of atmospheric temperature and pressure. Such compositions are, in many cases, preferable over, for example, thermally-cured or radiation cured coating compositions because (i) little or no energy is required to cure the composition, (ii) the materials from which some substrates are constructed cannot withstand elevated temperature cure conditions, and/or (iii) large or complex articles to be coated may not be convenient for processing through thermal or radiation cure equipment.

As a result, it would be desirable to provide one-component, waterborne, ambient curable coating compositions. Moreover, it would be desirable to provide compositions of this type that exhibit adhesion to a variety of substrates, including flexible substrates, and which exhibit other desirable properties, such as humidity resistance.

SUMMARY OF THE INVENTION

In certain respects, the present invention is directed to coating compositions comprising: (a) a polymer comprising the reaction product of reactants comprising: (i) a polycarbodiimide; and (ii) a ketocarboxylic acid; and (b) a compound comprising functional groups reactive with keto functional groups.

The present invention is also related to, inter alia, methods for using such coating compositions and substrates at least partially coated with a coating deposited from such compositions.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to coating compositions, such as one-component, waterborne, ambient curable coating compositions. As used herein, the term "one-component" refers to coating compositions in which all of the composition components are stored together in a single container and which are storage stable, which means that the viscosity of the composition does not significantly increase over time to the point in which the composition is no longer suitable for convenient use for depositing a coating. In fact, in certain embodiments, the coating compositions of the present invention exhibit a pot life of up to at least one year as evidenced by the lack of any significant increase in viscosity of the composition when stored in a sealed container at room temperature.

As used herein, "waterborne" refers to coating compositions in which the solvent or carrier fluid for the coating composition primarily or principally comprises water. For example, in certain embodiments, the carrier fluid is at least 80 weight percent water, based on the total weight of the carrier fluid. Moreover, certain of the coating compositions of the present invention are "low VOC coating compositions". As used herein, the term "low VOC composition" means that the composition contains no more than three (3) pounds of volatile organic compounds per gallon of the coating composition. As used herein, the term "volatile organic compound" refers to compounds that have at least one carbon atom and which are released from the composition during drying and/or curing thereof. Examples of "volatile organic compounds" include, but are not limited to, alcohols, benzenes, toluenes, chloroforms, and cyclohexanes.

As used herein, the term "ambient curable" refers to coating compositions that, following application to a substrate, are capable of curing in the presence of ambient air, the air having a relative humidity of 10 to 100 percent, such as 25 to 80 percent, and a temperature in the range of −10 to 120° C., such as 5 to 80° C., in some cases 10 to 60° C. and, in yet other cases, 15 to 40° C. As used herein, the term "cure" refers to a coating wherein any crosslinkable components of the composition are at least partially crosslinked. In certain embodiments, the crosslink density of the crosslinkable components, i.e., the degree of crosslinking, ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

As previously indicated, the coating compositions of the present invention comprise a polymer comprising the reaction product of reactants comprising: (i) a polycarbodiimide; and (ii) a ketocarboxylic acid. As used herein, the term "polymer" refers broadly to prepolymers, oligomers and both homopolymers and copolymers. The prefix "poly" as used herein refers to two or more.

As used herein, the term "polycarbodiimide" refers to a polymer containing two or more units having the structure: —N=C=N—. As will be appreciated, polycarbodiimides can generally be prepared by condensation reacting a polyisocyanate in the presence of a suitable catalyst to form a polycarbodiimide having terminal NCO-functionality, as will be more fully described below.

Suitable polyisocyanates for use in the foregoing condensation reaction, include, without limitation, aliphatic, including cycloaliphatic, heterocyclic, and/or aromatic polyisocyanates. Such polyisocyanates can contain, for example, from 2 to 4, such as 2 isocyanate groups per molecule. Examples of suitable higher polyisocyanates are 1,2,4-benzene triisocyanate and polymethylene polyphenyl isocyanate. Examples of suitable aromatic diisocyanates are 4,4'-diphenylmethane diisocyanate, 1,3-phenylene diisocyanate, 1,4-phenylene diisocyanate and tolylene diisocyanate. Examples of suitable aliphatic diisocyanates are straight chain aliphatic diisocyanates such as 1,4-tetramethylene diisocyanate and 1,6-hexamethylene diisocyanate. Examples of suitable cycloaliphatic diisocyanates are 1,4-cyclohexyl diisocyanate, isophorone diisocyanate, α,α-xylylene diisocyanate, dicyclohexylmethyldiisocyanate ("TMXDI"), and 4,4-methylene-bis(cyclohexyl isocyanate). Substituted organic polyisocyanates can also be used in which the substituents are nitro, chloro, alkoxy and other groups that are not reactive with hydroxyl groups or active hydrogens and provided the substituents are not positioned to render the isocyanate group unreactive.

Thioisocyanates can be employed as well as mixed compounds containing both an isocyanate and a thioisocyanate group. The terms "polyisocyanate" and "diisocyanate", as used herein, are intended to cover compounds and adducts containing thioisocyanate groups or isocyanate groups and compounds and adducts containing both isocyanate and thioisocyanate groups.

The polyisocyanate can be an NCO-containing adduct such as would be formed, for example, when an active hydrogen-containing compound is present before or during polycarbodiimide formation, as described below.

In accordance with the present invention, a polymer is used that is prepared by reacting a polycarbodiimide with a ketocarboxylic acid. As used herein, the term "ketocarboxylic acid" refers to a compound comprising at least one carboxylic acid (—COOH) group and at least one ketone (C—CO—C) group per molecule. In certain embodiments of the present invention, the ketocarboxylic acid has the general structure: R—CO—(CR'$_2$)$_n$—COOH, wherein: (a) R represents hydrogen or a monovalent hydrocarbon radical, such as a $C_{1-3}$ alkyl radical; (b) each R' independently represents hydrogen or a monovalent radical, such as a monovalent hydrocarbon radical; and (c) n is an integer having a value such that the ketocarboxylic acid has a molecular weight of up to 2000, such as a value of 1 to 6. In certain embodiments, R is $CH_3$, each R' is $CH_3$, and n is 2.

Specific examples of suitable ketocarboxylic acids for use in the foregoing reaction include, but are not limited to, 2-ketoglutaric acid, 3-ketoglutaric acid, pyruvic acid, levulinic acid, acetoacetic acid, acetoacetic acid amide, propionylacetic acid, acetonylmalonic acid, methyl acetoacetate, ethyl acetoacetate, and acetopyruvic acid.

In certain embodiments, the resulting polymer comprises units of the general structure (I):

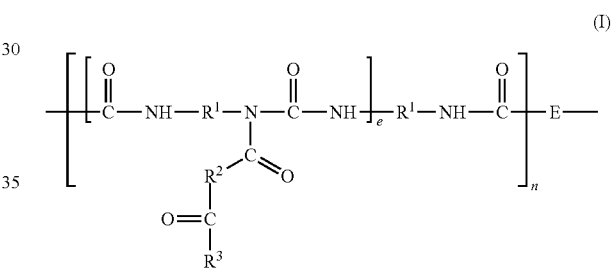

In certain embodiments, the resulting polymer comprises units of the general structure (II):

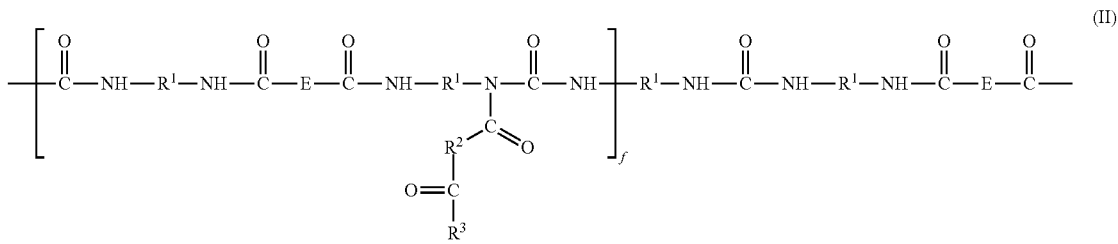

With respect to the foregoing general structures (I) and (II), e is an integer of from 1 to 20, such as 1 to 10; n is an integer of from 1 to 4, such as 1 or 2; f is an integer of from 1 to 20, such as 5 to 15, 8 to 12, or 10; E is either a single bond or a radical selected from O—X—O, S—X—S, or

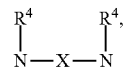

wherein X is a divalent hydrocarbon radical or a divalent silyl ether radical; $R^1$ and $R^2$ are each independently a divalent hydrocarbon radical, $R^1$ is often a cycloaliphatic group and $R^2$ is often $(CH_2)_2$; and each $R^3$ is independently hydrogen or a monovalent hydrocarbon radical, $R^3$ is often $CH_3$.

As used herein, "divalent" refers to a substituent group that, as a substituent group, forms two single, covalent bonds. As used herein, "divalent hydrocarbon radical" refers to a substituent group that is divalent and comprises carbon in the linking group backbone, such as is the case with hydrocarbon and fluorocarbon linking groups. As used herein, the terms "hydrocarbon group" and "fluorocarbon group" encompass various groups, such as, for example, branched or unbranched, acyclic or cyclic, saturated or unsaturated groups, and can contain from, for example, 1 to 24 (or in the case of an aromatic group from 3 to 24) carbon atoms. Non-limiting examples of suitable divalent hydrocarbon radicals include straight or branched chain alkylenes, such as methylene, ethylene, 1,3-propylene, 1,2-propylene, 1,4-butylene, 1,2-butylene, pentylene, hexylene, heptylene, octylene, nonylene, decylene, undecylene, octadecylene and icosylene. Non-limiting examples of suitable divalent hydrocarbon radicals also include cyclic alkylenes, such as cyclopentylene, cyclohexylene, cycloheptylene, cyclooctylene, and alkyl-substituted derivatives thereof. In certain embodiments, the divalent hydrocarbon radical can be chosen from phenylene and alkyl-substituted phenylene, such as methyl, ethyl, propyl, isopropyl and nonyl substituted phenylene.

As used herein, "divalent silyl ether radical" refers to a substituent group that is divalent and comprises silicon in the linking group backbone, such as is polysiloxane comprising alternating silicon and oxygen atoms.

As used herein, "monovalent" refers to a substituent group that, as a substituent group, forms only one single, covalent bond. As used herein, "monovalent hydrocarbon radical" refers to a substituent group that is monovalent and comprises carbon, such as, for example, alkyl, cycloalkyl, alkoxy, aryl, alkenyl, alkaryl, and alkoxyaryl groups. Nonlimiting examples of suitable alkyl groups include, for example, methyl, ethyl, propyl, isopropyl, iso-butyl, t-butyl, n-butyl, pentyl, hexyl, heptyl, octyl, nonyl, decyl, and dodecyl groups. As used herein, "lower alkyl" refers to alkyl groups having from 1 to 6 carbon atoms. Nonlimiting examples of suitable alkenyl groups include, for example, vinyl, allyl, and hexenyl. Nonlimiting examples of suitable substituted alkyl groups include, for example, chloromethyl, 3,3,3-trifluoropropyl, and 6-chlorohexyl. Nonlimiting examples of suitable cycloalkyl groups include, for example, cyclohexyl and cyclooctyl. Nonlimiting examples of suitable aryl groups include, for example, phenyl and naphthyl. Nonlimiting examples of suitable substituted aryl groups include, for example, benzyl, tolyl and ethylphenyl.

In the foregoing structures, E is a single bond when n is 1 and, alternatively, is the residue of an active hydrogen-containing chain extender when n is at least 2. More specifically, the residue of an active hydrogen-containing chain extender will be a radical selected from O—X—O, S—X—S, or

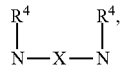

wherein X is a divalent hydrocarbon radical or a divalent silyl ether radical.

The foregoing polymers can be made by any of a variety of methods starting from a polycarbodiimide having terminal NCO-functionality. Moreover, the polymers can be produced from a polycarbodiimide made with or without use of an active hydrogen-containing chain extender.

The active hydrogen-containing chain extender is a spacer linking polyisocyanates together or linking isocyanate functional polycarbodiimides together, depending upon when the active hydrogen compound is added. For example, the chain extender can be added before, during, or after formation of the polycarbodiimide having terminal NCO-functionality. The foregoing polymers will have: (a) the structure (I) wherein n is 1 when no chain extender is employed; (b) the structure (I) wherein n is at least 2, such as 2 to 4, when the chain extender is added after formation of an isocyanate terminated polycarbodiimide as described above; and (c) the structure (II) when the chain extender is present before or during formation of the isocyanate terminated polycarbodiimide as described above.

Any suitable compound containing active hydrogens may be used as the chain extender, if a chain extender is employed. The term "active hydrogen atoms" refers to hydrogens which, because of their position in the molecule, display activity according to the Zerewitinoff test. Accordingly, active hydrogens include hydrogen atoms attached to oxygen, nitrogen, or sulfur, and thus useful compounds will include those having at least two hydroxyl, thiol, primary amine, and/or secondary amine groups (in any combination). In certain embodiments, the active hydrogen-containing chain extender contains from 2 to 4 active hydrogens per molecule.

Examples of such compounds include amines, which includes polyamines, aminoalcohols, mercapto-terminated derivatives, and alcohols that includes polyhydroxy materials (polyols). Suitable polyhydroxyl materials or polyols include low or high molecular weight materials and in, in certain cases, have average hydroxyl values as determined by ASTM designation E-222-67, Method B, of 2000 and below, such as between below 2000 and 10. The term "polyol" is meant to include materials having an average of two or more hydroxyl groups per molecule.

Suitable polyols include low molecular weight diols, triols and higher alcohols, low molecular weight amide-containing polyols and higher polymeric polyols such as polyester polyols, polyether polyols, polycarbonate polyols and hydroxy-containing (meth)acrylic polymers. The polymers typically have hydroxyl values of from 10 to 180.

The low molecular weight diols, triols and higher alcohols useful in the instant invention are known in the art. They have hydroxy values of 200 or above, usually within the range of 200 to 2000. Such materials include aliphatic polyols, particularly alkylene polyols containing from 2 to 18 carbon atoms. Examples include ethylene glycol, 1,4-butanediol, 1,6-hexanediol; cycloaliphatic polyols such as 1,2-cyclohexanediol and cyclohexane dimethanol. Examples of triols and higher alcohols include trimethylol propane, glycerol and pentaerythritol. Also useful are polyols containing ether linkages such as diethylene glycol and triethylene glycol and oxyalkylated glycerol and longer chain diols such as dimer diol or hydroxy ethyl dimerate.

In certain embodiments of the present invention, the chain extender comprises a silicone diol, which refers to diols comprising a polysiloxane structure that includes alternating silicon and oxygen atoms. In certain embodiments, the silicone diol is selected so that E in the foregoing structures (I) and (II) is a radical having the general structure:

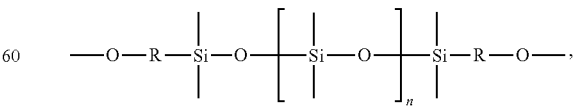

wherein (i) each R is independently a single bond or a divalent hydrocarbon group; and (ii) n is an integer. In certain embodiments, n and R are selected to give E a molecular weight of about 2000.

Specific examples of chain extenders that will produce an "E" having the foregoing general structure, include, but are not limited to, KF 6001 (produced by Shin-Etsu Chemical Co., Ltd.), DMS-C15 (produced by Gelest Inc.), and Z-6018 from Dow Corning.

As mentioned above, to manufacture a polycarbodiimide, an isocyanate terminated polycarbodiimide is first formed by condensation reacting a polyisocyanate, which may or may not have been previously chain extended by the reaction of a polyisyocanate with an active-hydrogen containing chain extender of the type previously described. The polyisocyanate is condensed with the elimination of carbon dioxide to form the isocyanate terminated polycarbodiimide.

The condensation reaction is typically conducted by taking the solution of a polyisocyanate and heating in the presence of suitable catalyst. Such reaction is described, for example by K. Wagner et al., Angew. Chem. Int. Ed. Engl., vol. 20, p. 819-830 (1981). Representative examples of suitable catalysts are described in e.g. U.S. Pat. No. 2,941,988, U.S. Pat. No. 3,862,989 and U.S. Pat. No. 3,896,251. Examples include 1-ethyl-3-phospholine, 1-ethyl-3-methyl-3-phospholine-1-oxide, 1-ethyl-3-methyl-3-phospholine-1-sulfide, 1-ethyl-3-methyl-phospholidine, 1-methylphospholen-1-oxide, 1-ethyl-3-methylphospholidine-1-oxide, 3-methyl-1-phenyl-3-phospholine-1-oxide and bicyclic terpene alkyl or hydrocarbyl aryl phosphine oxide or camphene phenyl phosphine oxide.

The particular amount of catalyst used will depend to a large extent on the reactivity of the catalyst itself and the polyisocyanate being used. A concentration range of 0.05-5 parts of catalyst per 100 parts of adduct is generally suitable.

The resulting polycarbodiimide has terminal isocyanate groups. The isocyanate terminated polycarbodiimide can then be further reacted by reacting the terminal isocyanate groups with an active hydrogen-containing hydrophilic compound to impart hydrophilicity to the polycarbodiimide enabling it to be dispersed in water. As a result, in certain embodiments, the foregoing polymer has the structure: Y—X—Y, wherein: (i) X represents the structure (I) or the structure (II); and (ii) Y is a radical comprising a hydrophilic unit. More particularly, in certain embodiments, each Y will comprise a urethane, thiourethane, and/or a urea bond, depending on the type of active hydrogen-containing hydrophilic compound employed.

Suitable active hydrogen-containing hydrophilic compounds include monofunctional active hydrogen containing hydrophilic compounds, such as any mono hydroxyl functional, mono thiol functional, and/or mono amine (primary or secondary amine) functional compound. In certain embodiments, however, the monofunctional active hydrogen containing hydrophilic compound comprises a polyether amine such as amines, preferably primary amines having a polyether backbone, typically based on ethylene oxide or mixed ethylene oxide and propylene and having a molecular weight greater than 500, such as at least 1000 on a number average basis. Typical amines have the structural formula set forth in paragraph [0032] of U.S. patent application Ser. No. 12/056, 306, the cited portion of which being incorporated herein by reference.

As a result, in certain embodiments of the present invention, the polymer described above that is included in the coating compositions of the present invention has the structure: Y—X—Y, wherein each Y has the general structure:

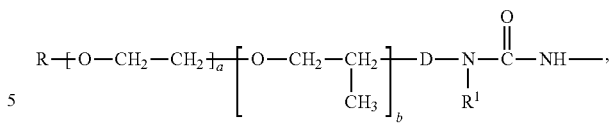

wherein: (a) R is a $C_{1-4}$ alkyl group; (b) a is 5 to 50; (c) b is 0 to 35, and when b is present the mole ratio of a to b is at least 1:1, preferably at least 6:1; (d) $R^1$ is hydrogen or a monovalent hydrocarbon radical; and (e) D is a divalent linking group or a single bond.

Reaction of the polyether amine with the NCO-containing carbodiimide is often conducted with a stoichiometric equivalent of amine to NCO equivalents or a slight excess of amine and at a temperature typically from 80 to 110° C. until an IR spectrum of the reaction mixture indicates substantially no remaining NCO functionality.

As indicated, the polymer used in the coating compositions of the present invention is produced by reacting a polycarbodiimide, such as the polycarbodiimide modified for hydrophilicity, with a ketocarboxylic acid. The Examples herein illustrate suitable conditions for carrying out such a reaction. In certain embodiments, this reaction is conducted with a stoichiometric equivalent of carbodiimide groups to carboxylic acid groups, or with a stoichiometric excess of carboxylic acid groups to carbodiimide groups, so that the resulting polymer is substantially, or, in some cases, completely free of any carbodiimide groups. The reaction can be conducted at a temperature of, for example, 40-80° C. until an IR spectrum of the reaction mixture indicates substantially no remaining carbodiimide units. Organic solvent can optionally be present. Moreover, a catalyst may be used if desired to catalyze the reaction of the carbodiimide groups to the carboxylic acid groups. Suitable catalysts include organometallics, including organotin compounds, such as dibutyltin diacetate, dibutyltin dioxide, and dibutyltin dilaurate, among others.

As a result, the present invention is also directed to polymers comprising units of the general formula (I) and polymers comprising units of the general formula (II).

In certain embodiments, the previously described polymer comprising the reaction product of reactants comprising a polycarbodiimide and a ketocarboxylic acid is present in the coating composition in an amount of 75 to 99 percent by weight, based on the total weight of resin solids in the composition.

As indicated, the coating compositions of the present invention also comprise (b) a compound comprising functional groups reactive with keto functional groups, often at least two such functional groups, examples of which include, without limitation, amine groups, hydrazide groups, semicarbazide groups, hydrazone groups, or a combination thereof. Non-limiting examples of suitable crosslinking agents include compounds comprising at least two hydrazide, i.e., $NH-NH_2$, groups. Specific examples of such compounds are set forth in U.S. Pat. No. 7,115,682 at col. 10, line 12 to col. 11, line 26, the cited portion of which being incorporated herein by reference. In certain embodiments, such a compound has the general structure:

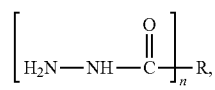

wherein (i) R represents a hydrocarbon radical, such as a divalent hydrocarbon radical, in some cases an alkene with 1-6 carbons; and (ii) n is an integer of from 2 to 10, such as 2 to 3, in some cases 2. In certain embodiments, R in the foregoing structure is $C_4H_8$ and n is 2.

Specific examples of suitable compounds comprising functional groups reactive with keto functional groups are, without limitation, diamines and polyamines as mentioned in Houben-Weyl, Volume E20, part 3, pp. 1965-1976, for example hexamethylenediamine, diaminotetramethylcyclohexane, 1,3-bis(aminomethyl)benzene, triethylenetriamine, tetraethylenetetramine, polyethylenamine, polyoxyalkylenamines such as polyoxyethylenamine. Examples of hydrazides are carbodihydrazide and the dihydrazides of aliphatic and alicyclic dicarboxylic acids and of hexahydroterephthalic acid. Also suitable are hydrazine and aryl- and alkylhydrazines or -hydrazones such as N,N'-dimethylhydrazine and the bishydrazones of glutaraldehyde and terephthalaldehyde, and also hydroxylamine esters.

In certain embodiments, the compound comprising functional groups reactive with keto functional groups is present in the coating composition in an amount of 1 to 25 percent by weight, based on the total weight of resin solids in the coating composition.

In certain embodiments, the resin solids are present in the coating compositions of the present invention in an amount of at least 50 percent by weight, such as 50 to 75 percent by weight, based on the total weight of the coating composition.

In certain embodiments, the coating compositions of the present invention also comprise a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coating compositions of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used in the coating compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, which is incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used in the coating compositions of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In certain embodiments, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with certain embodiments of the present invention, have minimal migration out of the coating. Example photosensitive compositions and/or photochromic compositions and methods for making them are identified in United States Published Patent Application No. 2006-0014099 A1, which is incorporated herein by reference.

In general, the colorant can be present in the coating composition in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The coating compositions of the present invention may further contain other optional ingredients such as organic solvents, antifoaming agents, pigment dispersing agents, plasticizers, ultraviolet absorbers, antioxidants, surfactants and the like. These optional ingredients when present are often present in amounts up to 30 percent, typically 0.1 to 20 percent by weight based on total weight of the coating composition.

Examples of suitable solvents are polar water miscible solvents used in the preparation of the polycarbodiimide, such as N-methylpyrrolidone. Additional solvent, such as N-methylpyrrolidone and various ketones and esters such as methyl isobutyl ketone and butylacetate can be added. When present, the organic solvent is sometimes present in amounts of 5 to 25 percent by weight based on total weight of the coating composition.

The coating compositions of the present invention can be produced by any method well known to the one having an ordinary skill in the art using the above components as raw materials. Suitable methods are described in the Examples herein.

The present invention also relates to methods of using the foregoing coating compositions. These methods comprise applying the coating composition to the surface of a substrate or article to be coated, allowing the composition to coalesce to form a substantially continuous film and then allowing the film to cure.

The coating compositions of the present invention are suitable for application to any of a variety of substrates, including human and/or animal substrates, such as keratin, fur, skin, teeth, nails, and the like, as well as plants, trees, seeds, agricultural lands, such as grazing lands, crop lands and the like; turf-covered land areas, e.g., lawns, golf courses, athletic fields, etc., and other land areas, such as forests and the like.

Suitable substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in, for example, U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminium tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminium derivatives, quebracho, chestnut or mimosa extracts, aromatic syntans, polyurethanes, (co) polymers of (meth) acrylic acid compounds or melamine, dicyanodiamide and/or urea/formaldehyde resins.

In certain embodiments, the coating compositions of the present invention are particularly suitable for application to "flexible" substrates. As used herein, the term "flexible substrate" refers to a substrate that can undergo mechanical stresses, such as bending or stretching and the like, without significant irreversible change. In certain embodiments, the flexible substrates are compressible substrates. "Compressible substrate" and like terms refer to a substrate capable of undergoing a compressive deformation and returning to substantially the same shape once the compressive deformation has ceased. The term "compressive deformation" and like terms mean a mechanical stress that reduces the volume at least temporarily of a substrate in at least one direction. Examples of flexible substrates includes non-rigid substrates, such as woven and nonwoven fiberglass, woven and nonwoven glass, woven and nonwoven polyester, thermoplastic urethane (TPU), synthetic leather, natural leather, finished natural leather, finished synthetic leather, foam, polymeric bladders filled with air, liquid, and/or plasma, urethane elastomers, synthetic textiles and natural textiles. Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include but are not limited to polystyrene foams, polyvinyl acetate and/or copolymers, polyvinyl chloride and/or copolymers, poly(meth)acrylimide foams, polyvinylchloride foams, polyurethane foams, and polyolefinic foams and polyolefin blends. Polyolefinic foams include but are not limited to polypropylene foams, polyethylene foams and ethylene vinyl acetate ("EVA") foams. EVA foam can include flat sheets or slabs or molded EVA foams, such as shoe midsoles. Different types of EVA foam can have different types of surface porosity. Molded EVA can comprise a dense surface or "skin", whereas flat sheets or slabs can exhibit a porous surface. "Textiles" can include natural and/or synthetic textiles such as fabric, vinyl and urethane coated fabrics, mesh, netting, cord, yarn and the like, and can be comprised, for example, of canvas, cotton, polyester, KELVAR, polymer fibers, polyamides such as nylons and the like, polyesters such as polyethylene terephthalate and polybutylene terephthalate and the like, polyolefins such as polyethylene and polypropylene and the like, rayon, polyvinyl polymers such as polyacrylonitrile and the like, other fiber materials, cellulosics materials and the like.

The coating compositions of the present invention have a wide variety of applications. For example, the flexible substrate can be incorporated into and/or form part of sporting equipment, such as athletic shoes, balls, bags, clothing and the like; apparel; automotive interior components; motorcycle components; household furnishings such as decorative pieces and furniture upholstery; wallcoverings such as wallpaper, wall hangings, and the like; floor coverings such as rugs, runners, area rugs, floor mats, vinyl and other flooring, carpets, carpet tiles and the like The coating compositions of the present invention can be applied to such substrates by any of a variety of methods including spraying, brushing, dipping, and roll coating, among other methods. In certain embodiments, however, the coating compositions of the present invention are applied by spraying and, accordingly, such compositions often have a viscosity that is suitable for application by spraying at ambient conditions.

After application of the coating composition of the present invention to the substrate, the composition is allowed to coalesce to form a substantially continuous film on the substrate. Typically, the film thickness will be 0.01 to 20 mils (about 0.25 to 508 microns), such as 0.01 to 5 mils (0.25 to 127 microns), or, in some cases, 0.1 to 2 mils (2.54 to 50.8 microns) in thickness. The coating compositions of the present invention may be pigmented or clear, and may be used alone or in combination as primers, basecoats, or topcoats.

The coating compositions of the present invention are curable in the presence of ambient air, the air having a relative humidity of 10 to 100 percent, such as 25 to 80 percent, and a temperature in the range of −10 to 120° C., such as 5 to 80° C., in some cases 10 to 60° C. and, in yet other cases, 15 to 40° C. and can be cured in a relatively short period of time to provide films that have good early properties which allow for handling of the coated objects without detrimentally affecting the film appearance and which ultimately cure to films which exhibit excellent hardness, solvent resistance and impact resistance.

Illustrating the invention are the following examples that are not to be considered as limiting the invention to their details. All parts and percentages in the examples, as well as throughout the specification, are by weight unless otherwise indicated.

EXAMPLE 1

A water-based polycarbodiimide resin was made using the ingredients listed in Table 1.

TABLE 1

| Ingredients | Parts by Weight |
|---|---|
| Charge #1 | |
| Desmodur W[1] | 280 |
| Phospholene oxide | 4.2 |
| Charge #2 | |
| Dibutyltin dilaurate | 0.024 |
| Charge #3 | |
| Methylisobutylketone | 170 |
| Charge #4 | |
| Aliphatic polycarbonate diol, PC-1122[2] | 259.3 |
| Charge #5 | |
| Jeffamine M1000 (XTJ-506)[3] | 216.5 |
| Charge #6 | |
| Deionized water | 1500 |
| Abex 2005[4] | 48.28 |

[1]Desmodur W is methylene-bis-(4-cyclohexyldiisocyanate) from Bayer Materials Science, LLC
[2]Aliphatic polycarbonate diol (PC-1122) is from STAHL, USA.
[3]Jeffamine M1000 is a polyetheramine from Huntsman (mole ratio of EO/PO = 6.3, MW = 1000)
[4]Abex 2005 is an anionic surfactant from Rhodia Charge #1 was added to a 2-liter, 4-necked flask equipped with a motor driven stainless steel stir blade, a water-cooled condenser, a nitrogen inlet, and a heating mantle with a thermometer connected through a temperature feedback control device. The contents of the flask were heated to 140° C. and held at that temperature until the isocyanate equivalent weight measured >350 eq/g by titration. The temperature was then decreased to 95° C. and Charge #2 was added. Charge #3 was added over 10 min and #4 was added over 30 min maintaining the reaction temperature at 90-100° C. The resulting mixture was held until the NCO equivalent weight stalled at about 3200 eq/g. Charge #5 was added and the mixture was held at 90-100° C. until IR spectroscopy showed the absence of the characteristic NCO band. The methylisobutylketone was stripped under the vacuum. The batch was cooled to 80-85° C., and Charge #6, after being preheated to 80-85° C., was added to the reaction flask over 20 min while maintaining the temperature below <85° C. A sample of the polycarbodiimide dispersion was placed in a 120° F. hot room for 4 weeks, and the resin remained dispersed.

EXAMPLE 2

A water-based polycarbodiimide resin was made using the ingredients listed in Table 2

TABLE 2

| Ingredients | Parts by Weight |
|---|---|
| Charge #1 | |
| Desmodur W[1] | 140 |
| Phospholene oxide | 2.1 |
| Charge #2 | |
| Dibutyltin dilaurate | 0.012 |
| Charge #3 | |
| Methylisobutylketone | 85 |
| Charge #4 | |
| Shin-Etsu diol, KF-6001[2] | 116.8 |
| Charge #5 | |
| Jeffamine M1000 (XTJ-506)[3] | 169.1 |
| Charge #6 | |
| Deionized water | 785 |
| Abex 2005[4] | 27.34 |

[1]Desmodur W is methylene-bis-(4-cyclohexyldiisocyanate) from Bayer Materials Science, LLC
[2]Shin-Etsu diol, KF6001 is from Shin-Etsu Chemical.
[3]Jeffamine M1000 is a polyetheramine from Huntsman (mole ratio of EO/PO = 6.3, MW = 1000)
[4]Abex 2005 is an anionic surfactant from Rhodia Charge #1 was added to a 2-liter, 4-necked flask equipped with a motor driven stainless steel stir blade, a water-cooled condenser, a nitrogen inlet, and a heating mantle with a thermometer connected through a temperature feedback control device. The contents of the flask were heated to 140° C. and held at that temperature until the isocyanate equivalent weight measured >350 eq/g by titration. The temperature was then decreased to 95° C. and Charge #2 was added. Charge #3 was added over 10 min and #4 was added over 30 min maintaining the reaction temperature at 90-100° C. The resulting mixture was held until the NCO equivalent weight stalled at about 2000 eq/g. Charge #5 was added and the mixture was held at 90-100° C. until IR spectroscopy showed the absence of the characteristic NCO band. The methylisobutylketone was stripped under the vacuum. The batch was cooled to 80-85° C., and Charge #6, after being preheated to 80-85° C., was added to the reaction flask over 20 min while maintaining the temperature below <85° C. A sample of the polycarbodiimide dispersion was placed in a 120° F. hot room for 4 weeks, and the resin remained dispersed.

EXAMPLES 3A and 3B

Resins were made using the ingredients listed in Table 3.

TABLE 3

| Raw Materials | Example 3A (Parts by Weight) | Example 3B (Parts by Weight) |
|---|---|---|
| Charge #1 | | |
| Product of Example 1 | 1272 | — |
| Product of Example 2 | — | 1272 |
| Charge #2 | | |
| Levulinic Acid[1] | 16.1 | 16.1 |
| Charge #3 | | |
| Adipic Acid Dihydrazide[2] | 6 | 6 |

[1]Levulinic Acid is from Sigma-Aldrich.
[2]Adipic Acid Dihydrazide is from Japan Fine Chemicals.

Charge #1 (30-35% solids in water) was added to a 2-L, 4-necked flask equipped with a motor driven stainless steel stir blade, a water-cooled condenser, a nitrogen inlet, and a heating mantle with a thermometer connected through a temperature feedback control device. Charge #2 was added at room temperature and heated to 60° C. The contents were held at that temperature until no change of NCO signal by IR. The reaction mixture was cooled to <30° C., Charge #3 was added and held until the entire solid dissolved. A sample of the polycarbodiimide dispersion was placed in a 120° F. hot room for 4 weeks, and the resin remained liquid.

EXAMPLES 4 and 5

Coating compositions were prepared using the ingredients and amounts (in grams) listed in Table 4.

TABLE 4

| Ingredient | Example 4 | Example 5 |
|---|---|---|
| Aquex White Tint[1] | 27.14 | 27.14 |
| BYK-24 defoamer[2] | 0.02 | 0.02 |
| Product of Example 3A | 59.99 | 0 |
| Product of Example 3B | 0 | 59.99 |
| Deionized Water | 8.3 | 8.3 |
| BYK 346 leveling agent[2] | 1.2 | 1.2 |
| Dowanol PPh solvent[3] | 0.34 | 0.34 |
| Dowanol DPM solvent[3] | 0.68 | 0.68 |
| DSX-1550 (rheology)[4] | 0.45 | 0.45 |
| Aquex Black Tint[1] | 0.68 | 0.68 |
| Halox Flash X-150 flash rust inhibitor[5] | 1.2 | 1.2 |
| Total | 100 g | 100 g |

[1]Commercially available from PPG Industries, Inc., Pittsburgh, PA
[2]Commercially available from BYK-Chemie
[3]Commercially available from Dow Chemicals
[4]Commercially available from Cognis Corporation
[5]Commercially available from Halox, a division of Hammond Group, Inc.

Test Substrates

The coating compositions of Examples 5 and 6 Coatings were spray applied on: pretreated steel panels B1000 P60 purchased from ACT Test Panels, Inc.; aluminum PT 1500 panels purchased from ACT Test Panels, Inc.; fiber glass composite panels, sheet molded compound (SMC) type, purchased from Standard Placque, Inc.; and polycarbonate acrylonitrile butadiene styrene (PC-ABS) panels purchased from Standard Placque, Inc. A five minute flash time was allowed before the oven cure of 30 minutes at 140° F.

Cured films were evaluated for adhesion, alcohol resistance, and humidity resistance. Results are set forth in Table 5.

TABLE 5

| Example No. | Adhesion[1] | Humidity Resistance[2] | 50 rubs with 70% isopropanol[3] | 50 rubs with 100% ethanol[3] |
|---|---|---|---|---|
| 4 | 5B to all steel, aluminum, fiber glass, polycarbonate | OK | pick off, mar | pick off, mar |
| 5 | 5B to steel, aluminum, fiber glass, polycarbonate | OK | pick off, mar | pick off, mar |

[1] Adhesion was measured using a test method ASTM D3359 with a paint adhesion test kit commercially available from Paul N. Gardner Company, Inc. The film was scribed with a cross-hatch pattern and an adhesive tape was applied to the scribed area. The tape was then removed and the area was evaluated on a 0B to 5B scale where 0B represents total paint delamination from the substrate and 5B means no paint has been removed.
[2] The humidity test consisted of exposing the coated panels to a humidity chamber set up at 100 F. and 100% RH for 7 days.
[3] Alcohol resistance was tested by immersing a Q-tip into the test solution and rubbing the film surface back and forth 50 times. If the substrate became visible at less than 50 double rubs, then the number of rubs was recorded. Otherwise, the surface was inspected after 50 rubs and evaluated for mar.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A coating composition comprising:
   (a) a polymer comprising two or more repeat units within a polymer chain, the polymer comprising the reaction product of reactants comprising:
      (i) a polycarbodiimide; and
      (ii) a ketocarboxylic acid having a (—COOH) group and one of a (—C—CO—C—) group and a (—C—CO—H) group wherein keto functional groups are within the repeat units of the polymer chain; and
   (b) a compound comprising functional groups reactive with keto functional groups; and wherein the polymer (a) comprises (1) and/or (2),
wherein:
   (1) is a polymer comprising units of the structure:

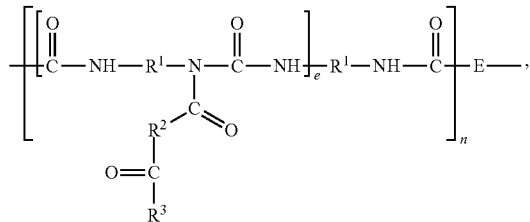

and
   (2) is a polymer comprising units of the structure:

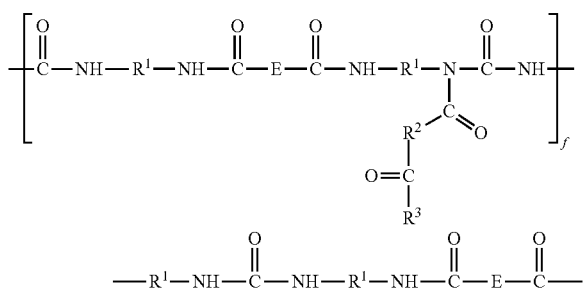

wherein
   (i) e is an integer of from 1 to 20;
   (ii) n is an integer of from 1 to 4;
   (iii) f is an integer of from 1 to 20;
   (iv) E is either a single bond or a group selected from O—X—O or S—X—S, wherein X is a divalent hydrocarbon group or a divalent silyl ether group;
   (v) $R^1$ and $R^2$ are each independently a divalent hydrocarbon group; and
   (vi) each $R^3$ is independently hydrogen or a monovalent hydrocarbon group.

2. The coating composition of claim 1, wherein the composition is waterborne.

3. The coating composition of claim 1, wherein the polycarbodiimide and the ketocarboxylic acid are reacted in amounts such that the molar ratio of carboxylic acid groups to carbodiimide groups is at least 1:1.

4. The coating composition of claim 1, wherein E is a group having the general structure:

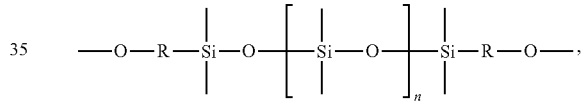

wherein
   (i) each R is independently a single bond or a divalent hydrocarbon group; and
   (ii) n is an integer.

5. The coating composition of claim 4, wherein n and R are selected to give E a molecular weight of about 2000.

6. The coating composition of claim 1, wherein the polymer (a) has the structure Y—X—Y, wherein:

(i) X represents (1) or (2); and
   (ii) Y is a group comprising a hydrophilic unit.

7. The coating composition of claim 6, wherein each Y comprises a urethane, thiourethane, and/or a urea bond.

8. The coating composition of claim 7, wherein each Y has the general structure:

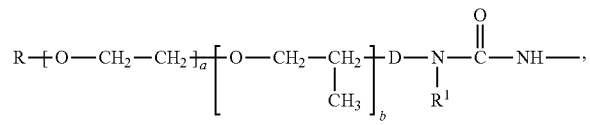

wherein:
   (a) R is a $C_{1-4}$ alkyl group
   (b) a is 5 to 50;
   (c) b is 0 to 35, and when b is present the mole ratio of a to b is at least 1:1;

(d) R¹ is hydrogen or a monovalent hydrocarbon group; and
(e) D is a divalent linking group or a single bond.

9. The coating composition of claim 1, wherein the ketocarboxylic acid has the general structure:

R—CO—(CR'₂)ₙ—COOH, wherein:

(a) R represents hydrogen or a monovalent hydrocarbon group;
(b) each R' independently represents hydrogen or a monovalent group; and
(c) n is an integer having a value such that the ketocarboxylic acid has a molecular weight of up to 2000.

10. The coating composition of claim 1, wherein the compound (b) has the general structure:

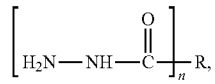

wherein
(i) R represents a hydrocarbon group; and
(ii) n is an integer of from 2 to 10.

11. The coating composition of claim 1, wherein the polymer (a) is present in an amount of 75 to 99 percent by weight, based on the total weight of resin solids in the composition.

12. A method of using the coating composition of claim 1, comprising:
(a) applying the coating composition of claim 1 to a substrate; and
(b) allowing the coating composition to coalesce to form a substantially continuous film and cure upon exposure to air having a relative humidity of 10 to 100 percent and a temperature of −10 to 120° F.

13. The method of claim 12, wherein the substrate is a flexible substrate.

14. The method of claim 12, wherein the substrate comprises a cellulosic-containing material.

15. A waterborne coating composition comprising:
(a) a polymer comprising (1) and/or (2), wherein:
(1) is a polymer comprising units of the structure:

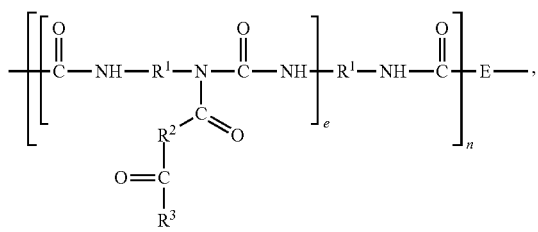

and
(2) is a polymer comprising units of the structure:

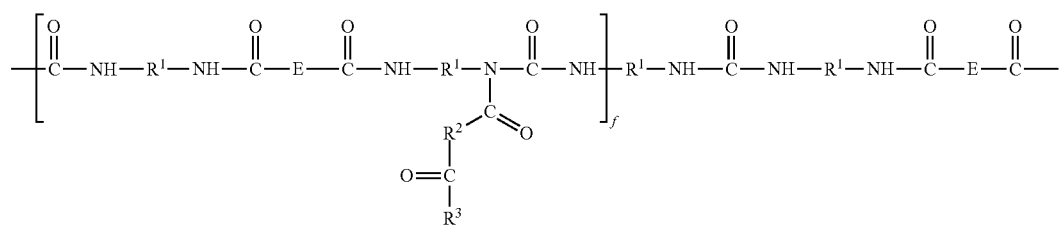

wherein
(i) e is an integer of from 1 to 20;
(ii) n is an integer of from 1 to 4;
(iii) f is an integer of from 1 to 20;
(iv) E is either a single bond or a group selected from O—X—O or S—X—S, wherein X is a divalent hydrocarbon group or a divalent silyl ether group;
(v) R¹ and R² are each independently a divalent hydrocarbon group; and
(vi) each R³ is independently hydrogen or a monovalent hydrocarbon; and (b) a compound having the general structure:

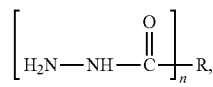

wherein
(i) R represents a hydrocarbon group; and
(ii) n is an integer of from 2 to 10.

16. A process for the preparation of a polymer comprising two or more repeat units within a polymer chain, the polymer comprising pendant ketone functionality, the process comprising:
(a) heating a polyisocyanate in the presence of a catalyst to form a polycarbodiimide having terminal isocyanate functionality wherein an active hydrogen-containing material is added before, during or after polycarbodiimide formation; and
(b) reacting the polycarbodiimide with a ketocarboxylic acid having a (—COOH) group and one of a (—C—CO—C—) group and a (—C—CO—H) group, to produce a polymer wherein the polymer comprises (1) and/or (2), wherein:

(1) is a polymer comprising units of the structure:

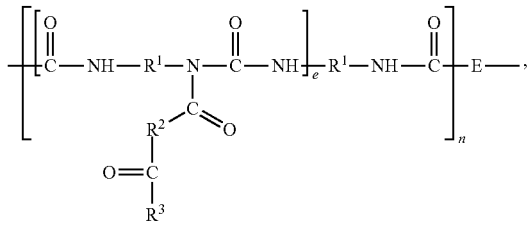

and is a polymer comprising units of the structure:

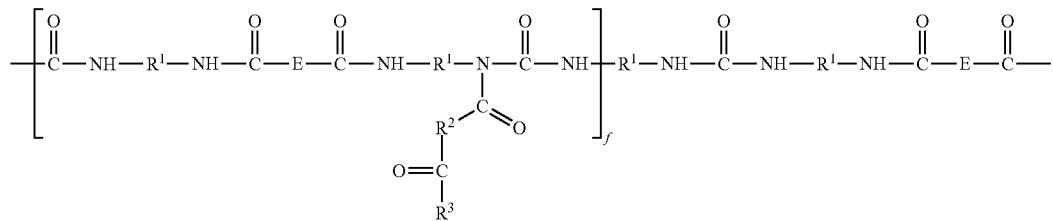

wherein
(i) e is an integer of from 1 to 20;
(ii) n is an integer of from 1 to 4;
(iii) f is an integer of from 1 to 20;
(iv) E is either a single bond or a group selected from O—X—O or S—X—S, wherein X is a divalent hydrocarbon group or a divalent silyl ether group;

(v) $R^1$ and $R^2$ are each independently a divalent hydrocarbon group; and (vi) each $R^3$ is independently hydrogen or a monovalent hydrocarbon group.

* * * * *